Patented Nov. 10, 1936

2,060,679

UNITED STATES PATENT OFFICE 2,060,679

FOOD PRODUCTS

Althea Lepper, New York, N. Y.

No Drawing. Application August 24, 1933,
Serial No. 686,661

5 Claims. (Cl. 99—136)

My invention relates to food products, and particularly to frozen confections such as ice creams, sherbets, ices and the like. My invention is particularly directed to methods and means for producing frozen confections with a minimum of labor and expense and by the use of a dry mixture adapted to be added to other materials at the time of use and frozen without agitation and at comparatively high freezing temperatures.

Heretofore, various recipes and preparations have been suggested for making ice cream and similar frozen confections, but it has been found in many instances that the product requires agitation or results in a non-homogeneous mixture in which one or more of the constituents have separated or stratified, and frequently objectionably large ice crystals are formed. In accordance with my invention, these objections to the products of the prior art are overcome and the preparation is provided in the form of a dry powdered mixture adapted to be added to a butter fat containing substance or to egg albumen or other materials used in producing the particular frozen confection desired. The material may be frozen without agitation to produce a uniform, homogeneous product substantially free from crystals of objectionably large size. Products embodying my invention are of particular value in that they may be produced on a large scale and distributed in dry form in packages of suitable size for domestic use. The product does not deteriorate with age and may be shipped or allowed to stand on the shelves of a store without substantial change in composition or characteristics. The product may be used in the home by simply adding the dry powder to the liquid ingredients used in producing the ice cream, sherbet, etc., and the resulting mixture may be frozen in a mechanical refrigerator in which the freezing temperature is comparatively high.

In my co-pending application S. N. 623,815, filed July 21, 1932, I have described a product adapted for use in producing ice cream without agitation and at comparatively high freezing temperatures. I have now discovered that the same or similar results may be attained by the use of certain materials, all of which are or may be dry when mixed or blended so that the product may be produced with a minimum of labor and expense.

One of the objects of my invention is to produce frozen confections without agitation thereof.

Another object of my invention is to provide a material adapted to be added to a butter fat containing substance and frozen to produce ice cream.

Another object of my invention is to produce ice cream and similar frozen confections at relatively high freezing temperatures.

A further object of my invention is to provide a substantially dry mixture adapted to be used in producing frozen confections.

These and other objects and features of my invention will appear from the following description thereof, in which reference is made to a preferred formula illustrative of my invention.

I have discovered that dry powdered mixtures can be used to produce satisfactory frozen confections which are substantially free from objectionably large crystals and which do not tend to separate upon standing or during freezing thereof. In accordance with my invention, the materials used are selected and proportioned so as to obtain a product in a dry powdered form, all of the constituents of which are readily available to the manufacturer and all of which are well known as food ingredients. The product obtained therefore complies with all food and health regulations.

One of the principal ingredients in products embodying my invention and which I believe to be new in dry powdered compositions used in producing frozen confections, is egg yolk. I prefer to use spray dried egg yolk which is obtainable commercially in the form of a fine dry powder readily soluble in liquids.

Another important constituent of compositions embodying my invention is an organic acid and preferably citric acid. Other fruit acids may also be used, and, as described in my co-pending application, the product may contain those acids found in canned fruit juices. These may include in addition to citric acid, tartaric, malic and/or maleic acids.

I also employ certain organic colloids of vegetable origin, and for this purpose I prefer to use agar. Other organic colloids such as those obtained by dehydration of canned fruit juices may also be used.

Pectin is a further ingredient in compositions embodying my invention and preferably is employed in the form of a fine, dry powder.

In addition to the foregoing constituents of products embodying my invention, I use sugar. I have found it desirable in most instances to use confectioners' sugar which may or may not contain small amounts of cornstarch. Other forms of sugar may be used in place of confectioners' sugar, especially if finely ground. One of the principal advantages in the use of confectioners' sugar is its extreme fineness and ready solubility in liquids, and, therefore, I ordinarily use what is known to the trade as XXXX Confectioners' sugar. In using the ingredients referred to above, I prefer to employ from about six to fifteen parts by weight of spray dried egg yolk together with from about sixty to one hundred and sixty parts by weight of confectioners' sugar, about 0.35 or less parts by weight of citric acid, about 0.05 to 0.20 part by weight of pectin, and from about one to three parts by weight of a vegetable colloid such as agar.

A typical example of compositions embodying my invention may have the following formula, the parts being given by weight:

|  | Parts |
|---|---|
| Egg yolk | 9.75 |
| Confectioners' sugar (1% cornstarch) | 100.00 |
| Citric acid | 0.25 |
| Agar | 1.16 |
| Pectin | 0.16 |

The above formula when reduced to terms of household proportions may be expressed as follows:

| | |
|---|---|
| Egg Yolk | 2 tablespoonfuls |
| XXXX Confectioners' Sugar | 9 tablespoonfuls |
| Citric acid | 1/32 plus teaspoonful |
| Pectin | 1/64 minus teaspoonful |
| Agar | ½ scant teaspoonful |

The amount of egg yolk may be varied from one to two tablespoonfuls, and will ordinarily be about one tablespoonful if the product is to be used with light cream, but will be about two tablespoonfuls if used with evaporated milk. The amount of sugar used may vary considerably, depending upon the taste of the individual and the flavoring agent employed, and will range from about six to twelve tablespoonfuls. The time required for freezing the mixture increases considerably with an increase in the amount of sugar used, and therefore this factor may control to some extent the amount of sugar used. Sweetened condensed milk may be used in employing products embodying my invention, in which case six tablespoonfuls of sugar will usually be sufficient. The amount of citric acid used is not ordinarily increased very materially above that indicated because of its effect upon the flavor of the product. The amount of pectin used may be reduced by half if desired, but if increased materially tends to give the product a bitter taste. The amount of agar used will vary with the increase in bulk of the product and the stiffness or texture desired. With these facts in mind, the amount of agar may be twice that indicated in the preferred formula given above.

The formula does not include any flavoring agent or extract. This may be added to the liquid constituents during the mixing operation to produce ice cream of any desired flavor. However, I prefer to incorporate the flavoring in the dry mixture in order that a flavored product may be sold to the housewife and used by simply adding the dry mixture to the liquid ingredients during mixing. As flavoring agent, I may use a concentrated extract, say vanilla extract of about six times the strength of the retail product, or I may use a cocoa of suitable flavor and ready solubility. The cocoa should be finely ground and may be enriched or "Dutched" cocoa if desired. The flavoring agent can be added to the dry ingredients during the mixing operation, or, as I prefer, the extract or flavoring is added to the sugar alone and mixed therewith prior to mixing the sugar with the remaining ingredients of the mixture. When using an extract in the form of an alcoholic solution or the like, the extract may be added to the sugar, and, after being thoroughly mixed therewith, the alcohol may be allowed to evaporate or may be driven off by heating or under vacuum or both. The flavored sugar is then mixed with the other constituents of the material. The quantity of flavoring agent used depends largely on the desired taste of the product and the quality of the flavoring agent. I have obtained very good results by the use of one-half tablespoonful of the concentrated vanilla extract to four ounces of the dry mixture, adding the extract to the sugar as described above.

The amounts given in the illustrative formula serve to produce four ounces of the dry mixture, and, when employed in making ice cream, are added to about sixteen ounces of light cream or twenty-eight ounces of evaporated milk. The milk or cream is first whipped until almost stiff and the dry powder is then gradually mixed with the whipped cream and the resulting product then further whipped until stiff. This mixture is then placed in the trays of a mechanical refrigerator or frozen in any other desired manner to produce ice cream. The proportions given above produce about one and one-half quarts of ice cream when light cream is employed, or about two quarts of ice cream when using evaporated milk. If the dry powdered mixture is to be used in producing a sherbet or an ice, the powder is added during mixing to the liquid ingredients used in forming the particular product desired. For example, in producing a sherbet, the dry powdered mixture containing the desired flavoring agent is added to the stiffly beaten whites of eggs, and when thoroughly incorporated, the material is frozen.

As described above, the ingredients used in producing the dry powdered mixture are preferably mixed together or blended while in the form of dry powders. However, in my co-pending application, I have described a product containing egg yolk, sugar, various organic acids and certain vegetable colloids. This product when originally prepared is in liquid form, but it may be dehydrated, and I have obtained very satisfactory results using a dehydrated form of the product described therein. Dehydrated forms of those products described in said co-pending application are therefore included with other forms of my invention as herein described for use as a dry mixture in producing frozen confections.

The length of time required for freezing ice cream, for example, will vary considerably with the temperature of freezing and the proportions of the ingredients (especially sugar) present in the dry mixture employed. Ordinarily, when using the formula given above, the product will freeze in about forty-five minutes when held at a temperature of from 8° to 10° F. If the freezing temperature is higher, say 16° to 18° F., the freezing time is longer and may be as much as two hours. I have also obtained very good results when freezing at temperatures as high as 20° F., but the freezing time is then considerably longer. If the amount of sugar used is increased, the product ordinarily requires a somewhat longer freezing time than when using relatively little sugar.

The characteristic high freezing temperature of products embodying my invention is of particular advantage in a material intended for use in the household where it will be employed in various types and styles of mechanical refrigerators, and this property of products embodying my invention is in marked contrast with previous methods of producing ice cream which require agitation and long freezing at temperatures ranging from zero to —40° F. in order to obtain satisfactory results.

While I have given one illustrative formula for products embodying my invention, and have indicated in general the range of variations in the amounts of the materials used, it should be understood that various other and equivalent materials may be used in combination with or as substitutes for part or all of the preferred ingredients indicated herein.

What I claim is:—

1. A product in dry powdered form for use in producing a frozen confection comprising egg yolk, pectin, a colloid of vegetable origin and an organic acid selected from the group consisting of citric, tartaric, malic, and maleic acids, the colloid being substantially greater in amount than the combined weight of the pectin and acid and the weight of the egg yolk being from 5 to 10 times as great as the weight of the colloid.

2. A product in dry powdered form for use in producing a frozen confection comprising egg yolk and sugar together with not more than about 3% by weight of pectin and agar with the pectin equalling one seventh or less of the weight of the agar.

3. A product in dry powdered form for use in producing a frozen confection having approximately the following composition in parts by weight:

| | Parts |
|---|---|
| Confectioners' sugar | 66 to 133 |
| Egg yolk | 5 to 10 |
| Vegetable colloid | 1 to 2.5 |
| Acid selected from the group consisting of citric, tartaric, malic and maleic acids | 0.25 or less |
| Pectin | .08 to .16 |

4. A product in dry powdered form for use in producing a frozen confection having approximately the following composition in parts by weight:

| | Parts |
|---|---|
| Confectioners' sugar | 100 |
| Egg yolk | 9.75 |
| Agar | 1.16 |
| Citric acid | 0.25 |
| Pectin | 0.16 |

5. A product in dry powdered form for use in producing a frozen confection comprising egg yolk, pectin, a colloid of vegetable origin and an organic acid selected from the group consisting of citric, tartaric, malic and maleic acids, the weight of colloid in the product being less than the weight of the egg yolk but equal to at least twice the combined weight of the acid and pectin.

ALTHEA LEPPER.